April 7, 1970  F. PLASSER ET AL  3,504,634
MOBILE TRACK LINER
Filed Nov. 13, 1967  2 Sheets-Sheet 1
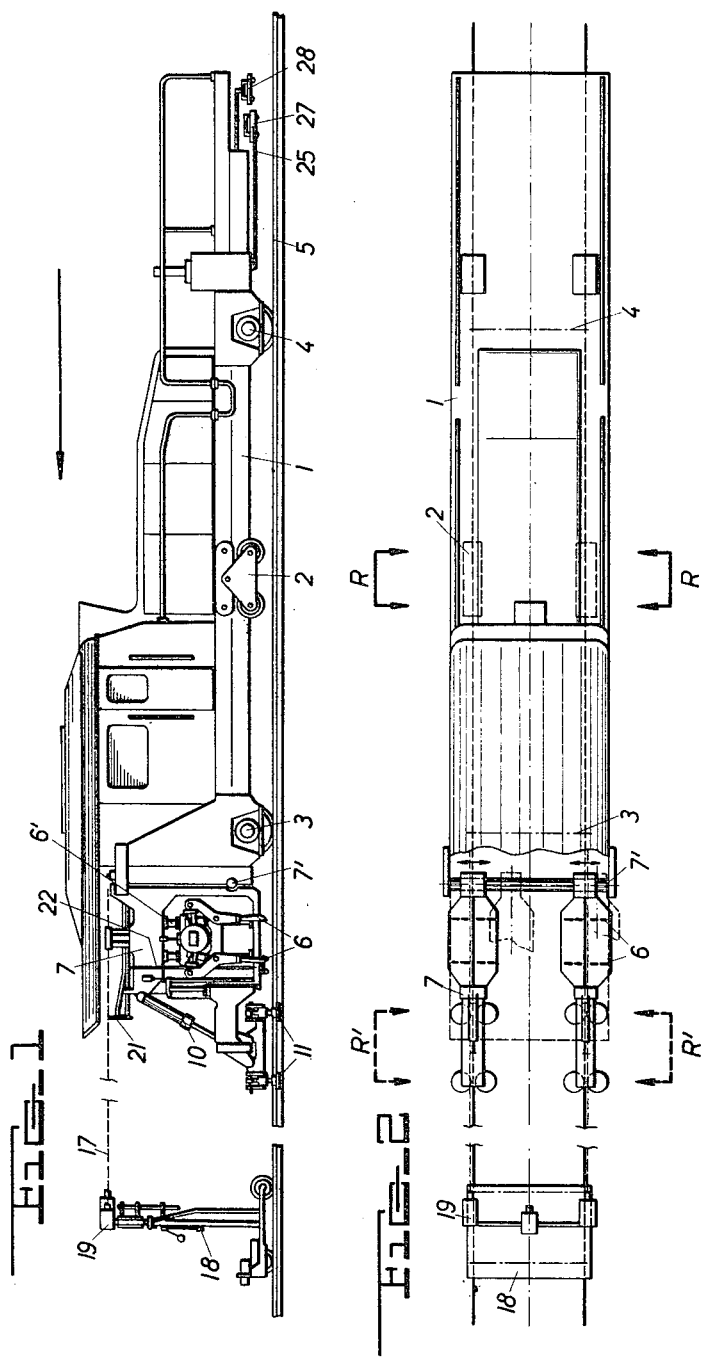
INVENTORS
FRANZ PLASSER
JOSEF THEURER
BY Kurt Kelman
AGENT

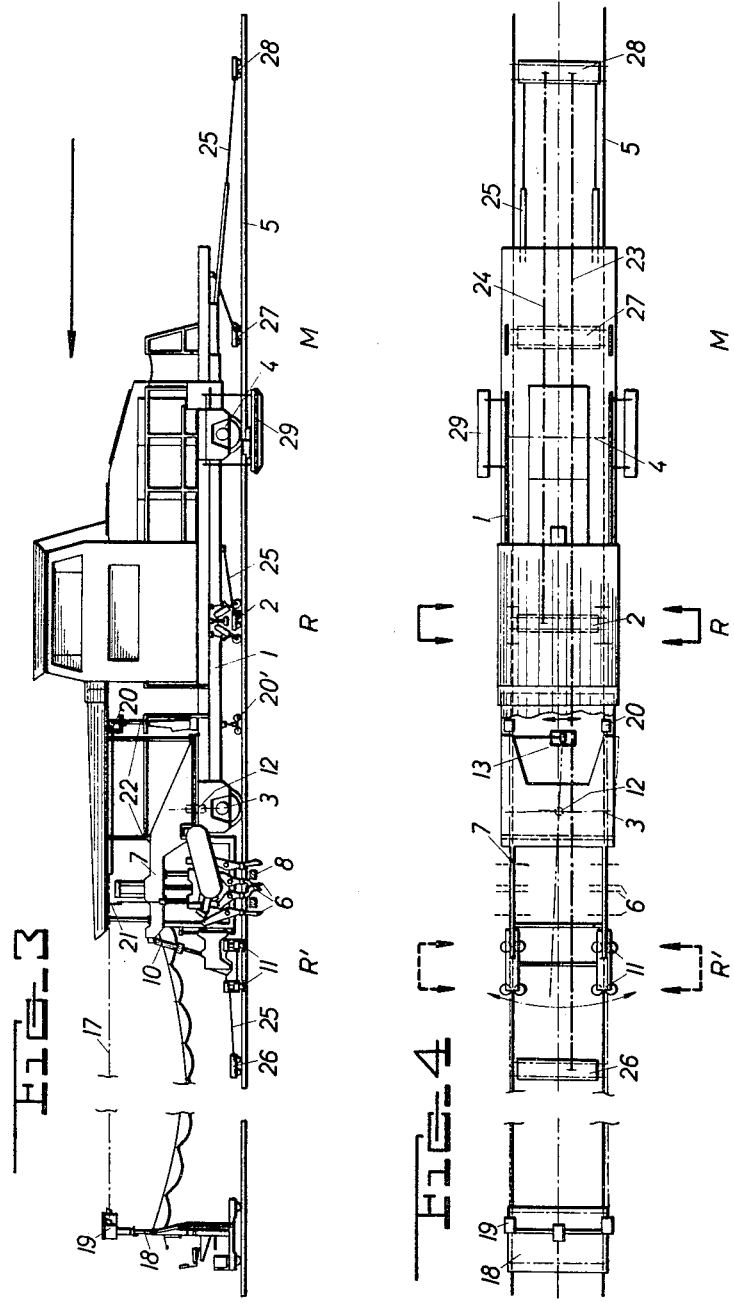

United States Patent Office 3,504,634
Patented Apr. 7, 1970

3,504,634
MOBILE TRACK LINER
Franz Plasser and Josef Theurer, both of
Johannesgasse 3, Vienna 1, Austria
Filed Nov. 13, 1967, Ser. No. 682,339
Claims priority, application Austria, Nov. 12, 1966,
A 10,757/66
Int. Cl. E01b 33/02
U.S. Cl. 104—7                                    10 Claims

ABSTRACT OF THE DISCLOSURE

A mobile track liner comprising a frame mounted on wheels for mobility on the track, track shifting means for fine-lining mounted on the frame, a second frame connected to the first frame forwardly thereof, and additional track shifting means on the second frame for coarse lining the track before it is fine-lined.

Background and summary of the invention

The present invention relates to a mobile track liner.

In our copending application Ser. No. 669,009, filed Sept. 20, 1967, entitled "Mobile Track Liner and Tamper," we have described a mobile track liner and tamper comprising two frames mounted on wheels for mobility on the track, with track shifting means mounted on one frame and tamping means mounted on the other frame. In a preferred embodiment of this track liner and tamper, the frame carrying the track tamping means is connected to the frame carrying the track shifting means so that it could be moved in relation thereto.

It is a primary object of the present invention to improve upon a machine of this type so as to improve the effectuation and accuracy of the lining operation.

This and other objects of this invention are accomplished by first coarsely lining a track section, grading and tamping the coarsely lined track section, and subsequently fine lining this section as the surfacing operation proceeds along the track. This reduces the danger that the track, due to its inherent elasticity, returns from its lined to the original, faulty position.

According to one aspect of the invention, the mobile track liner comprises two frames. The first frame is mounted on front and rear wheels for mobility on the track and first track shifting means are mounted on this frame between the front and rear wheels for laterally moving the track. The second frame is connected to the first frame forwardly of the front wheels thereof and additional track shifting means are mounted on the second frame for coarse lateral alignment of the track before fine alignment by means of the first track shifting means.

In accordance with a preferred embodiment, such a track liner is combined with the type of track grading apparatus which includes track lifting and tamping means. In such an embodiment, the latter means are also mounted on the second frame and, if the second frame is laterally movable in respect of the first frame, lateral movement of the track lifting means, when engaged with the track, will constitute the additional track shifting means. As described in the above-mentioned copending application, the second frame may not be only laterally but also vertically movable in respect of the first frame so that rail gripping means fixedly mounted on the second frame may constitute track lifting and shifting means upon vertical and lateral movement of the second frame.

Brief description of drawing

The above and other objects, advantages and features of the present invention will become better understood by reference to the following detailed description of two preferred embodiments thereof, taken in conjunction with the accompanying drawing wherein FIG. 1 is a side view of one embodiment of a track liner and tamper;
FIG. 2 is a top view of FIG. 1;
FIG. 3 is a side view of another embodiment; and
FIG. 4 is a top view of FIG. 3.

To avoid redundancy in the description, like reference numerals have been applied in all figures of the drawing to like parts operating in a like manner so that a single description of such parts and operation will serve for all figures.

Referring now to the drawing and first to FIGS. 1 and 2, there is shown a mobile track liner and tamper which includes a first frame 1 mounted on front wheels 3 and rear wheels 4 for mobility on track 5. The wheels are part of conventional trucks supporting carriages on tracks. First track shifting means 2 may take any known or suitable form, as described, for instance, in our copending application Ser. No. 662,180 filed Aug. 21, 1967 entitled "Apparatus for Indicating an/or Producing Lateral Track Alignment," and, as shown, may be raised out of engagement with the rails, is mounted centrally in respect of the ends of frame 1. Since the track shifting means may include rail engaging means as well as drive means for laterally moving the same, which are entirely conventional and which form no part of this invention, apart from the combination in which they appear, they will not be further described.

A second frame 7 is connected to the first frame forwardly of the front truck thereof, extending forwardly of the frame 1 so that frame 7 overhangs a track section to be surfaced in front of front wheels 3. Tamping means and track lifting means are mounted on second frame 7. The tamping means is constituted in the illustrated embodiment by the well known arrangement of pairs of vibratory tamping tools 6 which are mounted on a vertically adjustable carrier 6' and are reciprocated in the direction of track elongation for tamping ballast under respective ties each pair of tools embraces. The illustrated track lifting means also is conventional and includes a hydraulic motor 10 linked to a forward end of frame 7 and to a bracket supporting rail gripping rollers 11, 11, respectively.

As is shown in FIG. 2, means is provided for laterally moving the rail gripping elements whereby the rail gripping elements and the means for laterally moving the same constitute an additional track shifting means mounted on the second frame for coarse alignment of the track at track point R' before fine alignment at track point R by means of track shifting means 2. In the illustrated embodiment, the means for laterally moving the rail gripping elements 11 is a means for laterally moving the second frame in relation to the first frame and transversely of the track, the rail gripping elements being mounted on the second frame for lateral movement therewith.

The frame 7, which supports a group or groups of tampers 7 and a track lifting means 10, 11 associated with a respective track rail, is shown in FIG. 2 to be laterally movably mounted on a transverse support rail 7' mounted on the first frame 1 forwardly of its front wheels 3. Any suitable drive means, such as a hydraulic motor, may be used for moving the frames 7 along support rail 7'.

As is known, the track grading by means of the track lifting means is controlled by a pair of reference lines 17, 17 associated with the track rails and defined by a beam of radiant energy emitted from sender 19 and received by a receiver mounted on the track liner behind the tamping means. The beam emitter is mounted on a front bogie 18 which precedes the machine in the direction of operation shown by the horizontal arrow in FIG. 1. The beam receiver is mounted on a wheeled support mounted on the track in the range of the grading point. The spotboard 21, which rises with the track during grading, indicates when the desired grade is obtained, all of this structure and the concomitant operations being conventional and forming part of the present invention only inasmuch as combined with the lining mechanisms. In the embodiment of FIGS. 2 and 3, the spotboard is mounted on a pair of support rods 22, 22 which are spaced along the rail on which they rest, to compensate for grade errors, as is also well known.

As is shown in FIG. 4 and is also conventional, being described, for instance, in Austrian Patent No. 227,749, the lateral alignment of the track is controlled by a reference chord system including two chords of different length, the longer chord 23 extending from a front carriage 26 to a rear carriage 28. The carriages 26, 28 are coupled to the machine from spacing rods 25, 25 and may be retracted by means of these rods, as shown in FIG. 1 in respect of carriage 28. The chord 23 passes through track point R at which the track is to be fine-lined and through a track point at which a small measuring carriage 27 is also retractably coupled to the machine by means of a spacing rod 25. At the measuring carriage, the ordinates of the long chord 23 and a short chord 24, which extends from point R to carriage 28, are measured and compared for purposes of determining the proper alignment parameters in accordance with known surveying methods, as exemplified in the above-mentioned Austrian patent. At point R', only a coarse and preliminary alignment of the track is effected, the final alignment being effected at point R.

In the embodiment of FIGS. 3 and 4, the machine frame 1 also carries surface ballast tampers 29 for compacting the sides of the ballast bed adjacent the track rails.

The means for laterally moving the second frame 7a differs in this embodiment from that shown in FIG. 2. The frame 7a is supported on pivot 12 on first frame 1 for swinging movement in a horizontal plane. The pivot 12 is mounted substantially veritcally above front wheels 3 and the frame 7a may be swung about this pivot by hydraulic motor 13 or any other suitable drive means.

In the illustrated embodiment, the second frame 7a has a forked end having two arms each extending along one side of first frame 1, and the piston rod of the hydraulic motor 13 is connected to the arms of the second frame. Also, the tamping means is shown to comprise two groups of adjacent tamper pairs for simultaneously tamping two adjacent ties 8. The receiver 20 of beam 17 is mounted on a wheeled carriage 20' and may be vertically adjusted on its support.

While the invention has been illustrated with a laterally movable second frame, this frame may be fixed in relation to frame 1 and may even be integral therewith, extending forwardly thereof to overhang the track section to be graded. In such case, the track gripping elements must be mounted not only for vertical movement but also for lateral movement in relation to the frame so that they may be operated not only as track lifting but also as track shifting means. Also, if desired, the track lifting means may be separate from the track shifting means, i.e. the latter may be an independently mounted device on the second frame.

In the method of this invention, the track is first coarsely lined by means of the track shifting means mounted on the forward frame overhanging a track section to be graded, this track section is graded and tamped, and the track section is subsequently fine-lined as the surfacing operation proceeds along the track and the frame 1 is moved over this section until the track shifting means 2 have reached it.

While the invention has been described and illustrated in connection with certain preferred embodiments, it will be clearly understood that many variations and modifications may readily occur to those skilled in the art, particularly after benefiting from the present teaching, without departing from the spirit and scope thereof.

We claim:
1. A mobile track liner, comprising
  (1) a first frame mounted on front and rear wheels for mobility on the track;
  (2) first track shifting means mounted on the first frame between the front and rear wheels for laterally moving the track;
  (3) a second frame connected to the first frame forwardly of the front wheels thereof;
  (4) additional track shifting means mounted on the second frame for coarse lateral alignment of the track before fine alignment by means of the first track shifting means; and
  (5) means for laterally moving the second frame in relation to the first frame and transversely of the track.

2. The mobile track liner of claim 1, wherein said means for laterally moving the second frame includes a hydraulic motor.

3. The mobile track liner of claim 1, wherein the means for laterally moving the second frame comprises a transverse support rail mounted on the first frame forwardly of the front wheels thereof and supporting the second frame for lateral moving in respect thereto.

4. A method of surfacing track, comprising the steps of first coarsely lining, grading and tamping a track section, and subsequently fine lining the track section as the surfacing operation proceeds along the track.

5. A mobile track liner, comprising
  (1) a first frame mounted on front and rear wheels for mobility on the track;
  (2) first track shifting means mounted on the first frame between the front and rear wheels for laterally moving the track;
  (3) a second frame connected to the first frame forwardly of the front wheels thereof;
  (4) additional track shifting means mounted on the second frame for coarse lateral alignment of the track before fine alignment by means of the first track shifting means;
  (5) a pivot on the first frame for supporting the second frame thereon for swinging movement in a horizontal plane; and
  (6) a hydraulic motor connected to the second frame for swinging the same in the horizontal plane in a selected lateral direction.

6. The mobile track liner of claim 5, wherein the second frame has a forked end having two arms each extending along one side of the first frame, and the hydraulic motor is connected to the arms of the second frame.

7. A mobile track liner, comprising
  (1) a first frame mounted on front and rear wheels for mobility on the track;
  (2) first track shifting means mounted on the first frame between the front and rear wheels for laterally moving the track;
  (3) a second frame mounted on the first frame forwardly of the front wheels thereof;
  (4) additional track shifting means mounted on the second frame for coarse lateral alignment of the track before fine alignment by means of the first track shifting means;
  (5) tamping means mounted on the second frame; and
  (6) track lifting means mounted on the second frame.

8. The mobile track liner of claim 7, wherein said track lifting means comprises rail gripping elements, and further comprising means for laterally moving the rail gripping elements whereby the rail gripping elements and the means for laterally moving the same constitute the additional track shifting means.

9. The mobile track liner of claim 7, further comprising a pivot on the first frame for supporting the second frame thereon for swinging movement in a horizontal plane.

10. The mobile track liner of claim 9, wherein the pivot is mounted substantially vertically above the front wheels.

References Cited

UNITED STATES PATENTS

| | | | |
|---|---|---|---|
| 2,107,639 | 2/1938 | Madison | 104—12 |
| 3,011,454 | 12/1961 | Plasser et al. | 104—12 |
| 2,966,123 | 12/1960 | Talboys | 104—8 |
| 3,176,625 | 4/1965 | Plasser et al. | 104—8 |
| 3,196,803 | 7/1965 | Plasser et al. | 104—8 |
| 3,334,592 | 8/1967 | Plasser et al. | 104—8 |

ARTHUR L. LA POINT, Primary Examiner

R. A. BERTSCH, Assistant Examiner

PO-1050
(5/69)

UNITED STATES PATENT OFFICE
CERTIFICATE OF CORRECTION

Patent No. 3,504,634          Dated April 7, 1970

Inventor(s) Franz Plasser and Josef Theurer

It is certified that error appears in the above-identified patent and that said Letters Patent are hereby corrected as shown below:

> In the heading, line 6 (referring to the priority claim):
> Change "12" to --21--

SIGNED AND
SEALED
SEP 15 1970

(SEAL)
Attest:

Edward M. Fletcher, Jr.
Attesting Officer

WILLIAM E. SCHUYLER, JR.
Commissioner of Patents